(12) United States Patent
Argoitia et al.

(10) Patent No.: US 12,504,571 B2
(45) Date of Patent: *Dec. 23, 2025

(54) ARTICLE INCLUDING TWO EXTERNAL LAYERS OF ABSORBING NANOPARTICLES

(71) Applicant: VIAVI SOLUTIONS INC., San Jose, CA (US)

(72) Inventors: Alberto Argoitia, Santa Rosa, CA (US); Johannes P. Seydel, Petaluma, CA (US); Kangning Liang, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/841,243

(22) Filed: Apr. 6, 2020

(65) Prior Publication Data

US 2021/0311237 A1    Oct. 7, 2021

(51) Int. Cl.
*G02B 5/28* (2006.01)
*B32B 7/023* (2019.01)
*B32B 9/04* (2006.01)

(52) U.S. Cl.
CPC ............. *G02B 5/287* (2013.01); *B32B 7/023* (2019.01); *B32B 9/048* (2013.01); *G02B 5/286* (2013.01)

(58) Field of Classification Search
CPC ........ G02B 5/287; G02B 5/286; G02B 5/223; B32B 7/023; B32B 9/048; B44F 1/08; B44F 1/14
See application file for complete search history.

(56) References Cited

U.S. PATENT DOCUMENTS

| 5,814,686 | A | | 9/1998 | Micale et al. |
|---|---|---|---|---|
| 6,132,504 | A | * | 10/2000 | Kuntz ..................... C09D 5/36 427/217 |
| 6,490,090 | B1 | | 12/2002 | Kumazawa et al. |
| 6,531,221 | B1 | | 3/2003 | Schuhmacher et al. |
| 6,596,070 | B1 | | 7/2003 | Schmidt et al. |
| 6,686,042 | B1 | * | 2/2004 | LeGallee ................. B32B 7/02 428/404 |
| 6,777,085 | B1 | | 8/2004 | Argoitia et al. |
| 6,784,608 | B2 | | 8/2004 | Araki et al. |

(Continued)

FOREIGN PATENT DOCUMENTS

BR    102012017356 A2    3/2014
CN        1267686 A       9/2000
(Continued)

OTHER PUBLICATIONS

NanoComposix, "Silver Nanoparticles: Optical Properties", Oct. 24, 2014, 4 pages. (https://web.archive.org/web/20141024142316/https://nanocomposix.com/pages/silver-nanoparticles-optical-properties).

(Continued)

*Primary Examiner* — Zachary M Davis
(74) *Attorney, Agent, or Firm* — Mannava & Kang, P.C.

(57) ABSTRACT

An article including two external layers of absorbing nanoparticles; and at least one refractive index layer chosen from a high refractive index layer and a low refractive index layer, in which the at least one refractive index layer is between the two external layers of absorbing nanoparticles is disclosed. Additionally, there is disclosed a method of making the article.

12 Claims, 2 Drawing Sheets

(56) References Cited

U.S. PATENT DOCUMENTS

| | | | |
|---|---|---|---|
| 7,238,424 | B2 | 7/2007 | Raksha |
| 8,172,934 | B2 | 5/2012 | Hashizume |
| 11,214,689 | B2 | 1/2022 | Seydel et al. |
| 11,892,663 | B2 | 2/2024 | Kuna et al. |
| 12,091,557 | B2 | 9/2024 | Book et al. |
| 12,164,128 | B2 | 12/2024 | Argoitia et al. |
| 12,271,011 | B2 | 4/2025 | Argoitia et al. |
| 12,298,470 | B2 | 5/2025 | Argoitia et al. |
| 2002/0182383 | A1* | 12/2002 | Phillips ............. C09C 1/0051 428/199 |
| 2002/0192448 | A1* | 12/2002 | Schoen ............. C09C 1/0039 427/212 |
| 2003/0060538 | A1 | 3/2003 | Norris et al. |
| 2003/0177949 | A1 | 9/2003 | Phillips et al. |
| 2003/0190473 | A1 | 10/2003 | Argoitia et al. |
| 2003/0215641 | A1 | 11/2003 | Phillips et al. |
| 2003/0224164 | A1 | 12/2003 | Argoitia et al. |
| 2004/0124398 | A1 | 7/2004 | Kuntz et al. |
| 2005/0019575 | A1 | 1/2005 | Jungnitz et al. |
| 2005/0258419 | A1 | 11/2005 | Sankaran et al. |
| 2007/0126694 | A1 | 6/2007 | Moriyama et al. |
| 2007/0177273 | A1 | 8/2007 | Benson |
| 2008/0070153 | A1 | 3/2008 | Ioku et al. |
| 2008/0128286 | A1 | 6/2008 | Wu et al. |
| 2008/0292820 | A1 | 11/2008 | Padiyath et al. |
| 2008/0318012 | A1* | 12/2008 | Domnick ............. C09D 5/36 427/205 |
| 2010/0180796 | A1 | 7/2010 | Kitamura et al. |
| 2010/0208349 | A1* | 8/2010 | Beer ............. G02B 1/04 359/580 |
| 2010/0297045 | A1 | 11/2010 | Kaupp et al. |
| 2011/0197782 | A1 | 8/2011 | Wang et al. |
| 2011/0223218 | A1 | 9/2011 | Jones et al. |
| 2011/0237683 | A1 | 9/2011 | Schmid et al. |
| 2012/0050386 | A1 | 3/2012 | Shimizu et al. |
| 2013/0116106 | A1 | 5/2013 | Servin et al. |
| 2013/0131187 | A1 | 5/2013 | Hashizume et al. |
| 2013/0200415 | A1 | 8/2013 | Evans et al. |
| 2013/0221837 | A1 | 8/2013 | de Brouwer et al. |
| 2015/0116856 | A1 | 4/2015 | Lee et al. |
| 2015/0177433 | A1 | 6/2015 | Bumagai |
| 2016/0002432 | A1 | 1/2016 | Vo et al. |
| 2016/0061417 | A1 | 3/2016 | Kim et al. |
| 2016/0075165 | A1 | 3/2016 | Machizaud et al. |
| 2016/0185972 | A1 | 6/2016 | Schmidt |
| 2017/0328539 | A1 | 11/2017 | Huang |
| 2017/0348202 | A1 | 12/2017 | Grüner et al. |
| 2017/0355855 | A1 | 12/2017 | Grüner et al. |
| 2017/0369709 | A1 | 12/2017 | Seydel et al. |
| 2018/0073159 | A1 | 3/2018 | Curran et al. |
| 2018/0084658 | A1 | 3/2018 | Curran et al. |
| 2018/0239070 | A1* | 8/2018 | England ............. G02B 5/285 |
| 2018/0346346 | A1 | 12/2018 | Zhu et al. |
| 2019/0006541 | A1 | 1/2019 | So et al. |
| 2019/0182996 | A1 | 6/2019 | Kelkar et al. |
| 2020/0142128 | A1 | 5/2020 | Baer et al. |
| 2020/0215571 | A1 | 7/2020 | Argoitia et al. |
| 2020/0283637 | A1 | 9/2020 | Book et al. |
| 2020/0284947 | A1 | 9/2020 | Argoitia et al. |
| 2021/0231849 | A1 | 7/2021 | Argoitia et al. |
| 2021/0311235 | A1 | 10/2021 | Argoitia et al. |
| 2025/0102714 | A1 | 3/2025 | Argoitia et al. |

FOREIGN PATENT DOCUMENTS

| | | |
|---|---|---|
| CN | 1459034 A | 11/2003 |
| CN | 1542059 A | 11/2004 |
| CN | 1756805 A | 4/2006 |
| CN | 101120059 A | 2/2008 |
| CN | 102504620 A | 6/2012 |
| CN | 103804963 A | 5/2014 |
| CN | 105682451 A | 6/2016 |
| CN | 106526962 A | 3/2017 |
| CN | 108219541 A | 6/2018 |
| CN | 110337468 B | 10/2019 |
| DE | 102008060228 A1 | 6/2010 |
| EP | 0861299 B1 | 4/2000 |
| EP | 1254928 A1 | 11/2002 |
| EP | 2361953 A1 | 8/2011 |
| ES | 2341940 T | 6/2010 |
| JP | H04332766 A | 11/1992 |
| JP | H07157689 A | 6/1995 |
| JP | H08199098 A | 8/1996 |
| JP | H0959532 A | 3/1997 |
| JP | 2001152049 A | 6/2001 |
| JP | 2006521463 A | 9/2006 |
| JP | 2006299051 A | 11/2006 |
| JP | 2006347167 A | 12/2006 |
| JP | 2007518841 A | 7/2007 |
| JP | 2009221140 A | 10/2009 |
| JP | 2013518953 A | 5/2013 |
| JP | 2017149946 A | 8/2017 |
| KR | 20180066820 A | 6/2018 |
| RU | 2015143539 A | 4/2017 |
| WO | 2004050350 A1 | 6/2004 |
| WO | 2007094253 A1 | 8/2007 |
| WO | 2015052319 A1 | 4/2015 |
| WO | 2017041085 A1 | 3/2017 |
| WO | 2018199182 A1 | 11/2018 |

OTHER PUBLICATIONS

Alberto Argoitia, "U.S. Appl. No. 19/179,666, title Multilayer Articles Containing Organic Layers", filed Apr. 15, 2025, 37 pages.
Multilayer Articles Containing Organic filed Apr. 16, 2025, 34 pages.
Alberto Argoitia, "U.S. Appl. No. 19/181,149, title Multilayer Articles Containing Organic Layers" filed Apr. 16, 2025, 34 pages.
Marc Michel et al., "Review article: Deposition Mechanisms in Layer-by-Layer or Step-by-Step Deposition Methods: From Elastic and Impermeable Films to Soft Membranes with Ion Exchange Properties", ISRN Materials Science, vol. 2012, Article ID 701695, 13 pages.
R.K. Iler "Multilayers of Colloidal Particles", Journal of Colloid and Interface Science 21, year 1966, pp. 569-594.
Science Direct Topics, "Perylene- an overview", Downloaded from the Internet on Nov. 29, 2023, 18 pages. (https://www.sciencedirect.com/topics/chemistry/perylene#:~:text=Perylene%201%20is%20a%20polycyclic,high%2Dboiling%20mineral%20oil%20fractions.).
Wikipedia, "Perinone", downloaded from the Internet on Nov. 29, 2023, 2 pages.(https://en.wikipedia.org/wiki/Perinone).
Wikipedia, "Quinacridone", downloaded from the Internet on Nov. 29, 2023, 4 pages.(https://en.wikipedia.org/wiki/Quinacridone).
Yan Yan et al., "Assembly of Layer-by-Layer Particles and Their Interactions with Biological Systems", ACS Publications, Aug. 22, 2013, 9 pages.
Wikipedia, "Germanium", downloaded from the Internet on Dec. 11, 2023, 20 pages. <https://en.wikipedia.org/wiki/Germanium>.

\* cited by examiner

ARTICLE INCLUDING TWO EXTERNAL LAYERS OF ABSORBING NANOPARTICLES

FIELD OF THE INVENTION

The present disclosure generally relates to an article, such as an optical device, including two external layers of absorbing nanoparticles; and at least one refractive index layer chosen from a high refractive index layer and a low refractive index layer, wherein the at least one refractive index layer is between the two external layers of absorbing nanoparticles. A method of making the article is also disclosed.

BACKGROUND OF THE INVENTION

Thin film interference structures can include an absorber layer, which traditionally, is a thin metallic layer that partially reflects, partially absorbs, and partially transmits light. All metal layers have this property, but the ratios at which they reflect, absorb, transmit varies as a function of wavelength. The absorber layer traps light in an optical cavity in order to leverage the interference effect. Generally, these absorber layers are made of pure materials like chromium, W, Ni, C, Fe or cermet, but sometimes include dark dielectrics that function like a neutral density filter, e.g., some metal compounds such as oxides, carbides, nitrides, borides, and their combinations.

Decorative pigment applications rely upon a desired color travel, good hiding, and high flop. Quarter wave (QW) stacks are thin film interference designs of layers of high refractive (H) index material and low refractive (L) index material to produce high reflectivity over a wide range of wavelengths and that can be selected by adjusting the thickness of the layers. Quarter wave stack designs that are made of transparent or semitransparent materials, depending on the number of HL layers, may have low or high color travel. Additionally, their hiding will depend on the characteristic layer absorption of the layers and on the number of HL layers of the optical design. In particular, in the case of QW stack designs with low hiding, the overall reflected light of an object painted with the decorative pigment would include light that is transmitted through the pigment and reflected off the underlying painted surface and through the pigment flake again.

The manufacturing of special effect pigments frequently requires expensive and time-consuming vapor deposition of layers under vacuum. Sometimes, the manufacturing of special effect pigments requires multiple stages with different layers deposited using different deposition techniques. This can be the case when the materials present in a layer must be deposited under vacuum What is needed is an article, such as a special effect pigment, in which all the materials in all the layers can be deposited using a single deposition technique in a single stage to decrease expense and time. The article, such as a special effect pigment, can be used in decorative pigment applications by including absorbing materials that would provide the desired color travel, good hiding, and excellent flop without the use of metallic deposited layers.

SUMMARY OF THE INVENTION

In an aspect, there is disclosed an article including two external layers of absorbing nanoparticles; and at least one refractive index layer chosen from a high refractive index layer and a low refractive index layer, wherein the at least one refractive index layer is between the two external layers of absorbing nanoparticles.

In another aspect, there is disclosed a method of making an article comprising depositing, using a liquid coating process, onto a substrate, a first layer of absorbing nanoparticles; depositing, using a liquid coating process, at least one refractive index layer chosen from a high refractive index layer and a low refractive index layer; and depositing, using a liquid coating process, a second layer of absorbing nanoparticles.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1:
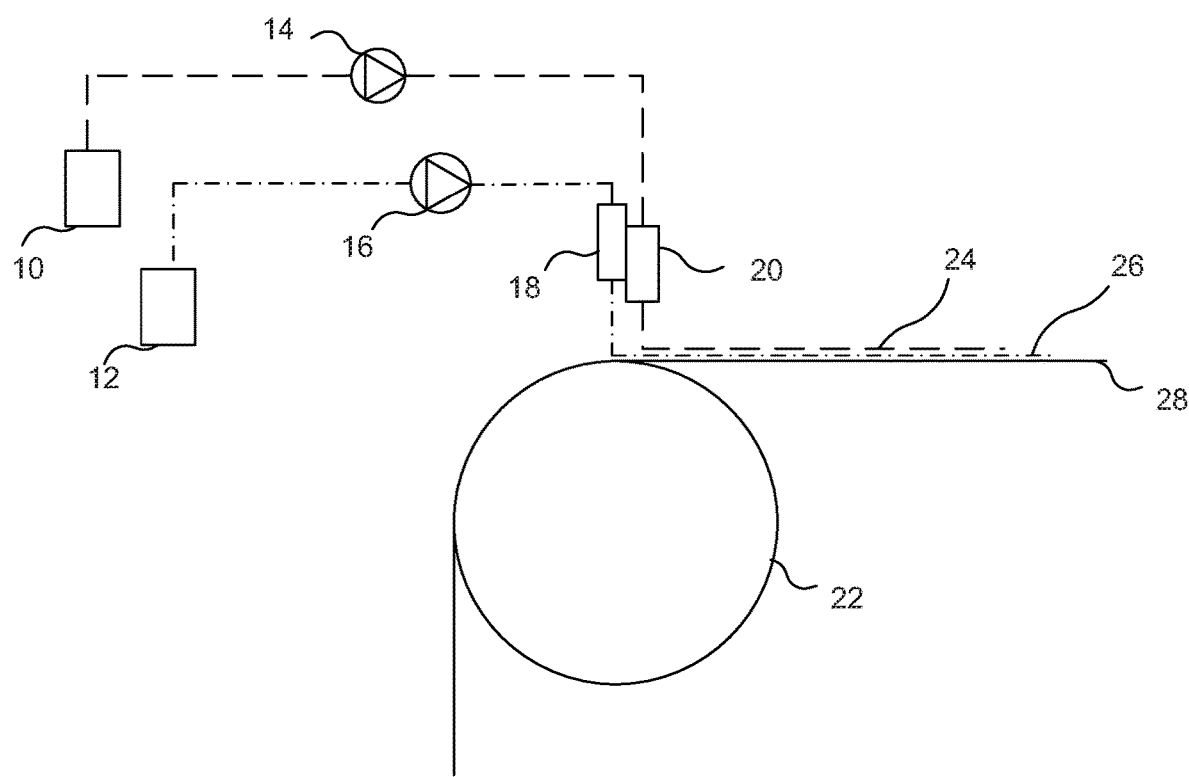
FIG. 1 illustrates a method of forming an article according to an aspect of the invention.

It is to be understood that both the foregoing general description and the following detailed description are exemplary and explanatory only, and are intended to provide an explanation of various embodiments of the present teachings. The layers/components shown in each Figure may be described with regard to a particular Figure, but it is understood that the description of a particular layer/component would be applicable to the equivalent layer/component in the other Figures.

In its broad and varied embodiments, disclosed herein is an article comprising two external layers of absorbing nanoparticles; and at least one refractive index layer chosen from a high refractive index layer and a low refractive index layer, in which the at least one refractive index layer is between the two external layers of absorbing nanoparticles. The article can include an internal layer of absorbing nanoparticles. The article can include an internal layer of metallic nanoparticles. The article will be described more fully below. It will be appreciated that the article can include one or more of the layers discussed above in various combinations.

The article can be an optical device, for example, in a form of a flake, a pigment, or a foil. The pigment can be a special effect pigment. The article can be combined with a carrier to form a composition, such as an ink or paint. The article can be opaque. The articles can have high flop and the color travel could be adjusted based on the thickness and number of the dielectric layers.

For the purpose of the application, "nanoparticle(s)" is understood to mean having a median particle size of less than about 500 nm, for example, from about 100 nm to about 300 nm, and as a further example less than about 100 nm.

For the purpose of the application, "layer of" is understood to comprise the recited material, such as metallic nanoparticles, but also to include other materials, such as those described below for a composition.

The article can include multiple layers. For ease of reference, each layer in the article can be described by their components and/or the function of the layer, e.g., a layer of absorbing nanoparticles, a refractive index layer, a layer of metallic nanoparticles, etc. Each layer can include a composition comprising a carrier; at least one nanoparticle (chosen from organic nanoparticles and inorganic nanoparticles); and optionally other materials chosen from other nanoparticles (e.g., nanoparticles of colored materials), energy curable materials, additives, and combinations thereof. In this manner, the composition can provide properties (functional and/or optical) to the layer. For example, the composition of at least one layer can define the layer as a high refractive index layer or a low refractive index layer. The at least one refractive index layer can include a carrier and at least one nanoparticle chosen from organic nanoparticles and inorganic nanoparticles.

The article can include two external layers of absorbing nanoparticles, such as optically active absorbing nanoparticles. This layer is not a layer of thin metal, for example, applied by vacuum deposition processes. Rather, the layer of absorbing nanoparticles can include a carrier and at least one nanoparticle, such as nanoparticles with absorbing properties. Non-limiting examples of nanoparticles with absorbing properties include carbon, graphite, silicon, germanium, cermets, metals mixed in a dielectric matrix, alloys such as Inconel, stainless steel, Hastalloys, titanium-based alloys (titanium mixed tungsten, titanium mixed with niobium, titanium mixed with silicon) and other substances that are capable of acting as a uniform or selective absorber in the visible spectrum. The nanoparticles with absorbing properties can be used to create the layer of absorbing nanoparticles.

The layer of absorbing nanoparticles can reflect light at wavelengths where the at least one refractive index layer reflects light. The layer of absorbing nanoparticles can absorb light at wavelengths where the at least one refractive index layer is transparent. The layer of absorbing nanoparticles and the at least one refractive index layer can have different indexes of refraction.

The article can include at least one refractive index layer chosen from a high refractive index layer and a low refractive index layer. The high refractive index layer can include a composition comprising a carrier and at least one nanoparticle of a high refractive index material, i.e., having a refractive index greater than greater than about 1.65. Non-limiting examples of high refractive index materials include, zinc sulfide (ZnS), zinc oxide (ZnO), zirconium oxide ($ZrO_2$), titanium dioxide ($TiO_2$), diamond-like carbon, indium oxide ($In_2O_3$), indium-tin-oxide (ITO), tantalum pentoxide ($Ta_2O_5$), cerium oxide (CeO2), yttrium oxide ($Y_2O_3$), europium oxide ($Eu_2O_3$), iron oxides such as (II) diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon, silicon monoxide (SiO), selenium trioxide ($Se_2O_3$), tin oxide ($SnO_2$), tungsten trioxide ($WO_3$), or their combinations.

The low refractive index layer can include a composition comprising a carrier and/or at least one nanoparticle of a low refractive index material, i.e., having a refractive index less than about 1.65. Non-limiting examples of low refractive index materials include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), or their combinations. Organic monomers and polymers can be utilized as low refractive index materials, including dienes or alkenes such as acrylates (e.g., methacrylate), perfluoroalkenes, polytetrafluoroethylene (Teflon), fluorinated ethylene propylene (FEP), or their combinations thereof.

The at least one refractive index layer can have a specific number of quarter waves optical thickness (QWOT). For example, the at least one refractive index layer can have a 2QWOT. As another example, the at least one refractive index can have a 4 QWOT.

In the article, at least one refractive index layer can be a stack of layers of low refractive index layers and high refractive index layers. Each layer of the stack can include a composition comprising a carrier and at least one nanoparticle. Any suitable carrier can be used that can accommodate the suspension of the at least one nanoparticle; and other materials chosen from other nanoparticles (e.g., nanoparticles of colored materials), energy curable materials, additives, and combinations thereof. The carrier can be a medium chosen from polar and non-polar solvents. Non-limiting examples of a suitable carrier include acetates, such as ethyl acetate, propyl acetate, and butyl acetate; acetone; water; ketones, such as dimethyl ketone (DMK), methyl-ethyl ketone (MEK), sec-butyl methyl ketone (SBMK), ter-butyl methyl ketone (TBMK), cyclopenthanon, and anisole; glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. The carrier can be an organic matrix. The carrier can have a low refractive index.

The layer of absorbing nanoparticles and/or the at least one refractive index layer can include a composition comprising a carrier and at least one nanoparticle chosen from organic nanoparticles and inorganic nanoparticles. Non-limiting examples of the at least one nanoparticle include nanoparticles of a metal, metal oxide nanoparticles, metal sulfide nanoparticles, nanoparticles with absorbing properties, a nanoparticle of a high refractive index material, a nanoparticle of a low refractive index material, nanoparticles of colored materials (dyes and/or pigments), and combinations thereof.

The at least one nanoparticle can be an inorganic nanoparticle, such as nanoparticles of a metal. Non-limiting examples of nanoparticles of metal include aluminum, palladium, platinum, niobium, chromium, silver, titanium, vanadium, tungsten, molybdenum, rhodium, iron, cobalt, copper, tin, gold, nickel, their alloys, metal carbides, metal oxides, metal nitrides, metal sulfides, or their combinations. The nanoparticle of metal can be a complex colored oxide nanoparticle. The nanoparticles of metal for use in the composition of the layer of absorbing nanoparticles is not in a form of a thin layer of metal, but is instead included in a composition with a carrier, i.e., is a nanoparticle suspended in the carrier.

The at least one nanoparticle can be an inorganic nanoparticle, such as metal oxide nanoparticles. Non-limiting examples of metal oxide nanoparticles include CuO, $SiO_2$, $TiO_2$, $Al_2O_3$, $ZrO_2$, $WO_3$, $VO_5$, ITO, $Ta_2O_5$, $CeO_2$, $Y_2O_3$, $Sc_2O_3$, ZnO, $In_2O_3$, $La_2O_3$, MgO, $Nd_2O_3$, $Pr_6O_{11}$, $Fe_2O_3$, $Fe_3O_4$, SiO, $SnO_2$, FeOx (where x is an integer greater than 0), or their combinations.

The at least one nanoparticle can be an inorganic nanoparticle, such as metal sulfide nanoparticles. Non-limiting examples of metal sulfide nanoparticles include copper (I) sulfide, tin sulfide, nickel sulfide, silver sulfide, lead sulfide, molybdenum sulfide, iron disulfide, zinc sulfide, or combinations thereof. Complex ternary systems can also be used such as chalcopyrite and bornite.

The at least one nanoparticle can be an organic nanoparticle, such as an organic colored material, such as dyes. Any dye recognized in the Colour Index™ published by the Society of Dyers and Colourists can be used. Non-limiting examples of organic colored materials include carbon, graphite, perylene, perinone, quinacridone, pyrrole, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindolinone, pyranthrone, isoviolanthrone, miyoshi methane, triarylmethane, or mixtures thereof. The organic colored material can also be cobalt green, cobalt blue, Prussian blue, and manganese violet.

The at least one nanoparticle also include other nanoparticles, such as nanoparticles of inorganic colored materials, such as pigments. Any pigment recognized in the Colour Index™ published by the Society of Dyers and Colourists can be used. Non-limiting examples of pigments include C.I. Pigment Red 123 (C.I. No. 71 145), C.I. Pigment Red 149 (C.I. No. 71 137), C.I. Pigment Red 178 (C.I. No. 71 155), C.I. Pigment Red 179 (C.I. No. 71 130), C.I. Pigment Red 190 (C.I. 71 140), C.I. Pigment Red 224 (C.I. No. 71 127), C.I. Pigment Violet 29 (C.I. No. 71 129), C.I. Pigment Orange 43 (C.I. No. 71 105), C.I. Pigment Red 194 (C.I. No. 71 100), C.I. Pigment Violet 19 (C.I. No. 73 900), C.I. Pigment Red 122 (C.I. No. 73 915), C.I. Pigment Red 192, C.I. Pigment Red 202 (C.I. No. 73 907), C.I. Pigment Red 207, C.I. Pigment Red 209 (C.I. No. 73 905), C.I. Pigment Red 206 (C.I. No. 73 900/73 920), C.I. Pigment Orange 48 (C.I. No. 73 900/73 920), C.I. Pigment Orange 49 (C.I. No. 73 900/73 920), C.I. Pigment Orange 42, C.I. Pigment Yellow 147, C.I. Pigment Red 168 (C.I. No. 59 300), C.I. Pigment Yellow 120 (C.I. No. 11 783), C.I. Pigment Yellow 151 (C.I. No. 13 980), C.I. Pigment Brown 25 (C.I. No. 12 510), C.I. Pigment Violet 32 (C.I. No. 12 517), C.I. Pigment Orange 64; C.I. Pigment Brown 23 (C.I. No. 20 060), C.I. Pigment Red 166 (C.I. No. 20 730), C.I. Pigment Red 170 (C.I. No. 12 475), C.I. Pigment Orange 38 (C.I. No. 12 367), C.I. Pigment Red 188 (C.I. No. 12 467), C.I. Pigment Red 187 (C.I. No. 12 486), C.I. Pigment Orange 34 (C.I. No. 21 115), C.I. Pigment Orange 13 (C.I. No. 21 110), C.I. Pigment Red 9 (C.I. No. 12 460), C.I. Pigment Red 2 (C.I. No. 12 310), C.I. Pigment Red 112 (C.I. No. 12 370), C.I. Pigment Red 7 (C.I. No. 12 420), C.I. Pigment Red 210 (C.I. No. 12 477), C.I. Pigment Red 12 (C.I. No. 12 385), C.I. Pigment Blue 60 (C.I. No. 69 800), C.I. Pigment Green 7 (C.I. No. 74 260), C.I. Pigment Green 36 (C.I. No. 74 265); C.I. Pigment Blue 15:1, 15:2, 15:3, 15:4, 15:6 and 15 (C.I. No. 74 160); C.I. Pigment Blue 56 (C.I. No. 42 800), C.I. Pigment Blue 61 (C.I. No. 42 765:1), C.I. Pigment Violet 23 (C.I. No. 51 319), C.I. Pigment Violet 37 (C.I. No. 51 345), C.I. Pigment Red 177 (C.I. No. 65 300), C.I. Pigment Red 254 (C.I. No. 56 110), C.I. Pigment Red 255 (C.I. No. 56 1050), C.I. Pigment Red 264, C.I. Pigment Red 270, C.I. Pigment Red 272 (C.I. No. 56 1150), C.I. Pigment Red 71, C.I. Pigment Orange 73, C.I. Pigment Red 88 (C.I. No. 73 312), C.I. Pigment Yellow 175 (C.I. No. 11 784), C.I. Pigment Yellow 154 (C.I. No. 11 781), C.I. Pigment Yellow 83 (C.I. No. 21 108), C.I. Pigment Yellow 180 (C.I. No. 21 290), C.I. Pigment Yellow 181 (C.I. No. 11 777), C.I. Pigment Yellow 74 (C.I. No. 11 741), C.I. Pigment Yellow 213, C.I. Pigment Orange 36 (C.I. No. 11 780), C.I. Pigment Orange 62 (C.I. No. 11 775), C.I. Pigment Orange 72, C.I. Pigment Red 48:2/3/4 (C.I. No. 15 865:2/3/4), C.I. Pigment Red 53:1 (C.I. No. 15 585:1), C.I. Pigment Red 208 (C.I. No. 12 514), C.I. Pigment Red 185 (C.I. No. 12 516), C.I. Pigment Red 247 (C.I. No. 15 915), Pigment Black 31 (C40H26N2O4), Pigment Orange 16 (C32H24Cl2N8O2), or combinations thereof.

As discussed above, the composition can comprise an energy curable material. For example, the layer can include a composition comprising a carrier, at least one nanoparticle, and an energy curable material. The energy curable material can include any material that can suspend the at least one nanoparticle, can be used in a liquid coating process, and/or can cure upon application of energy. Non-limiting examples of energy curable materials include thermoplastics, thermosets, other materials, or combinations thereof. Non-limiting examples of the thermoplastics include polyesters, polyolefins, polycarbonates, polyamides, polyimides, polyurethanes, acrylics, acrylates, polyvinylesters, polyethers, polythiols, silicones, fluorocarbons, and various co-polymers thereof. Non-limiting examples of thermosets include epoxies, polyurethanes, acrylates, melamine formaldehyde, urea formaldehyde, and phenol formaldehyde. Non-limiting examples of other energy curable materials include acrylates, epoxies, vinyls, vinyl esters, styrenes, silanes, siloxanes, titanates, zirconates, aluminates, silicates, phosphazanes, polyborazylenes, polythiazyls, or combinations thereof.

As discussed above, the composition can comprise an additive, such as one or more additives. For example, the composition can comprise a carrier, at least one nanoparticle, an energy curable material, and an additive. The additive can assist in deposition of the at least one layer, and/or curing of the composition. Non-limiting examples of an additive include a curing agent, a coating aid, leveling agents, wetting agents, defoamers, adhesion promoters, antioxidants, UV stabilizers, curing inhibition mitigating agents, antifouling agents, corrosion inhibitors, photosensitizers, photoinitiator, secondary crosslinkers, oxygen inhibition mitigation composition, and infrared absorbers for enhanced infrared drying.

As discussed above, the article can include the at least one refractive index layer, such as a stack of refractive index layers, including one or more stacks; and an additional layer, such as one or more additional layers. The additional layer can be an internal layer of absorbing nanoparticles, a layer of metallic nanoparticles, a layer of colored dielectric nanoparticles, and/or a 2-quarter wave dielectric layer.

A layer of colored dielectric materials can include a composition comprising a carrier and at least one nanoparticle of colored materials (dyes and/or organic or inorganic pigments) and high refractive index nanoparticles, or low refractive index nanoparticles. For example, the layer of colored dielectric materials can include dielectric nanoparticles that are designed to have a certain optical thickness and thereby exhibit a certain color, such as blue at a wavelength of 450 nm. Additionally, or alternatively, the layer of colored dielectric materials can include dielectric nanoparticles and nanoparticles of colored materials. The layer of metallic nanoparticles can include a composition comprising a carrier and nanoparticles of a metal.

In forming the article, care should be taken to bifurcate the layers to preserve a difference in the refraction index of each layer, which can drive the reflectivity of the article. For example, a first layer can include at least one nanoparticle each having a similar high refractive index, such as phthalocyanine blue and transparent titanium dioxide. This first layer can have an average refractive index around 2.0. The second layer can include a low refractive index polymer so that the second layer can have an average refractive index between 1.3 to about 1.5.

The article can include one or more stacks of layers of low refractive index layers and high refractive index layers, for example, alternating layers. The one or more stacks can be adjacent to one another in the article without any additional layers. Additionally, and/or alternatively, the one or more stacks can be separated one from another by additional layers, such as an internal layer of absorbing nanoparticles, and/or an internal layer of metallic nanoparticles. If additional layers are present, then the one or more stacks can be external layers with the additional layers internal to the article; or the additional layers can be external layers with the one or more stacks internal to the article. Non-limiting exemplary articles are disclosed further herein.

As discussed above, the stack in the article can include layers of low refractive (L) index layers and high refractive (H) index layers. The stack can have a bottom layer, one or more middle layers, and a top layer, in which it is understood that the words "bottom" and "top" are used for ease of reference and are not limiting as to placement in the stack. In an aspect, the bottom layer and the top layer are both low refractive index layers. In an aspect, the bottom layer and the top layer are both high refractive index layers. In an aspect, the bottom layer is a low refractive index layer and the top layer is a high refractive index layer or vice versa. In another aspect, the stack includes an odd number of alternating layers, for example, 3 alternating layers, 5 alternating layers, 7 alternating layers, and 9 alternating layers. In another aspect, the stack includes an even number of alternating layers, for example, 4 alternating layers, 6 alternating layers, 8 alternating layers, and 10 alternating layers. The stack can have the formula (HLH)n, in which n is an Integer greater than or equal to 1.

The article can have the following exemplary structures, in which the layers of the article are as described above. As a legend in the structures, "absorbing" is a layer of absorbing nanoparticles, "metallic" is a layer of metallic nanoparticles, "H" is a layer of high refractive index nanoparticles, "L" is a layer of low refractive index nanoparticles; and "stack" is as described above:

absorbing/H or L with a specific QWOT/absorbing
absorbing/stack/absorbing
absorbing/H or L/absorbing/H or L/absorbing
absorbing/H or L/metallic/H or L/absorbing
absorbing/stack/absorbing/stack/absorbing The article can include two external layers of absorbing nanoparticles, as described above. The article can also include at least one refractive index layer, as described above. The at least one refractive index layer can be a high refractive index layer with a specific quarter wave optical thickness. The at least one refractive index layer can be a low refractive index layer with a specific quarter wave optical thickness.

The article can include two external layers of absorbing nanoparticles, as described above. The article can also include at least one refractive index layer, as described above. The at least one refractive index layer can be a stack of alternating layers of low refractive index layers and high refractive index layers, as described above.

The article can include two external layers of absorbing nanoparticles, as described above. The article can also include at least one refractive index layer, as described above. The article can also include an internal layer of absorbing nanoparticles. The at least one refractive index layer can be two refractive index layers that are separated one from another by the internal layer of absorbing nanoparticles. The article can be a five-layer article with three layers (two external and one internal) of absorbing nanoparticles and two refractive index layers, with each layer of absorbing nanoparticles separated by a refractive index layer, such as a high refractive index layer or a low refractive index layer. The two refractive index layers in the article can be the same (e.g., H and H) or different (e.g., H and L or L and H) from one another.

The article can include two external layers of absorbing nanoparticles, as described above. The article can also include at least one refractive index layer, as described above. The article can also include an internal layer of metallic nanoparticles. The at least one refractive index layer can be two refractive index layers that are separated one from another by the internal layer of metallic nanoparticles. The article can be a five-layer article with two external layers of absorbing nanoparticles, two refractive index layers, and an internal layer of metallic nanoparticles. The article can be symmetrical with the same layers on each side of the internal layer of metallic nanoparticles or asymmetrical with different layers on each side of the internal layer of metallic nanoparticles. For example, a symmetrical article can include refractive index layers that are the same (e.g., H and H). As another example, an asymmetrical article can include refractive index layer that are different (e.g., H and L or L and H) from one another.

The article can include two external layers of absorbing nanoparticles, as described above. The article can also include at least one refractive index layer, as described above. The article can also include an internal layer of absorbing nanoparticles. The at least one refractive index layer can be a stack of alternating layers of low refractive index layers and high refractive index layers, as described above. The stack can be two stacks of alternating layers of low refractive index layers and high refractive index layers, and in which the two stacks are separated one from another by the internal layer of absorbing nanoparticles. The article can be a five-layer article with two external layers of absorbing nanoparticles, two stacks of refractive index layers, and an internal layer of absorbing nanoparticles. The article can be symmetrical with the same stack or asymmetrical with different stacks on each side of the internal layer of absorbing nanoparticles. For example, a symmetrical article can include stacks that are the same (e.g., (HLH)n and (HLH)n). As another example, an asymmetrical article can include stacks that are different (e.g., (HLH)n or (LHL)n) from one another. The letter n is an integer greater than or equal to 1.

A method of forming an article can include depositing, using a liquid coating process, onto a substrate, a first layer of absorbing nanoparticles; depositing, using the liquid coating process, at least one refractive index layer chosen from a high refractive index layer and a low refractive index layer; and depositing, using the liquid coating process, a second layer of absorbing nanoparticles. The layer of absorbing nanoparticles, the high refractive index layer, and the low refractive index layer can be as described above.

FIG. 1 illustrates a method of forming an article using a multi-channel liquid coating process using a slot die with multiple channels or slots. Two or more layers can be applied simultaneously and/or sequentially in a roll-to-roll configuration. For example, a first container 10 can include a first composition 24 that is pumped through a first feed pump 14 through a first slot die 20. A second container 12 can include a second composition 26 that is pumped through a second feed pump 16 through a second slot die 18. Both compositions 24, 26 can be applied simultaneously through first and second slot dies 18, 20 in a manner so that the first composition 24 can be deposited as a first layer onto the second composition 26 that is deposited as a second layer, i.e., they can be in offset locations one from the other. The second composition 26 can be deposited on the substrate 28 that is fed along a roller 22. The method does not use a vacuum step.

The substrate 28 can be any suitable material that can receive deposited layers. The substrate 28 can include a release layer. The deposited layers can include, but are not limited to, any of the layers disclosed herein, such as at least one refractive index layer chosen from a low refractive index layer and a high refractive index layer, a layer of absorbing nanoparticles, a layer of metallic nanoparticles, etc. The deposited layers can include a plurality of each of the layers. Additionally, the deposited layers can be in any order.

The method can also include drying and curing, optionally after each deposition and before a next layer is deposited. The method can further include, after deposition of all of the layers, water stripping the release layer and deposited layers, filtering the deposited layers, drying, and grinding to form the article, for example, a flake.

The substrate 28 for use in the method can be made of a flexible material. Non-limiting examples of substrate 28 materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate 28 can include a release layer.

The article can be formed using a liquid coating process for each layer. The liquid coating process can include, but is not limited to: slot-bead, slide bead, slot curtain, slide curtain, in single and multilayer coating, tensioned web slot, gravure, roll coating, and other liquid coating and printing processes that apply a composition onto a substrate 28 or previously deposited layer to form a liquid layer or film that is subsequently dried and/or cured.

In an aspect, a method of forming the article can include using a multi-channel slot die to apply two or more layers simultaneously and/or sequentially. This method can achieve a higher productivity with a less stages, such as a single stage. In the disclosed method, the layers of the article do not require to be deposited under vacuum and thereby avoid the cost and loss of productivity associated with vacuum deposition techniques.

Figure 2:
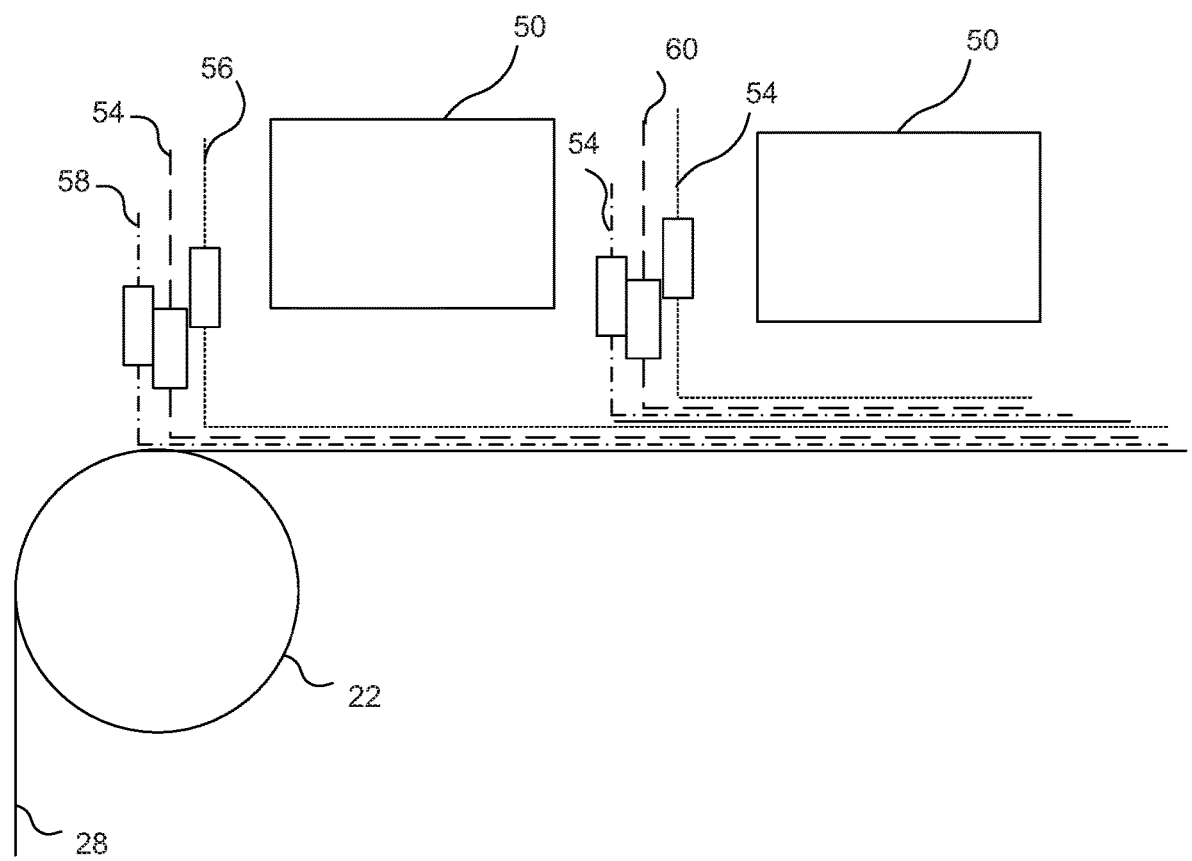
FIG. 2 illustrates a method of forming an article according to another aspect of the invention.

FIG. 2 illustrates a method of forming an article using a multi-channel liquid coating process using multiple channel slot dies. A roller 22 provides a substrate 28. A first slot die (not shown) can include three separate channels each independently include a release layer 58, a composition 54 comprising a carrier and absorbing nanoparticles, and a composition 56 comprising a carrier and high refractive index nanoparticles. The compositions 58, 54, 56 can be deposited simultaneously, or just slightly sequentially in time and space, so that the release layer 58 can be deposited onto the substrate 28, the layer of absorbing nanoparticles 54 can be deposited onto the release layer 58, and the layer of high refractive index nanoparticles 56 can be deposited onto the layer of absorbing nanoparticles 54 to form a first set of deposited layers. The first set of deposited layers can be subjected to a first drying and/or curing stage 50. A second slot die (not shown) can include three separate channel each independently including a composition 54 comprising a carrier and absorbing nanoparticles, and a composition 60 comprising a carrier and low refractive index nanoparticles, and/or the low index organic carrier, and a composition 54 comprising a carrier and absorbing nanoparticles, respectively. The compositions 54, 56 can be deposited simultaneously, or just slightly sequentially in time and space, so that the composition 54 of absorbing nanoparticles can be deposited onto the composition 56 of high refractive index nanoparticles of the first set of deposited layers, and the composition 60 of low refractive index nanoparticles, and/or the low index organic carrier, from the second slot die can be deposited onto the composition 54 of absorbing nanoparticles of the second slot die; and the composition 54 of absorbing nanoparticles from the second slot can be deposited onto the composition 60 of low refractive index nanoparticles, and/or the low index organic carrier, to form a second set of deposited layers, which have been deposited onto the first set of deposited layers to form an article (with an optional release layer 58 and substrate 28). The article can be subjected to a second drying and/or curing stage 50. The method does not use a vacuum step.

The method illustrated in FIGS. 1 and 2 can be used to form the articles discussed above with the layers discussed above.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An article comprising:

two external absorbing layers of absorbing nanoparticles, the external absorbing layers being the outermost deposited layers of the article; and at least one refractive index layer chosen from a high refractive index layer (H) and a low refractive index layer (L), wherein the at least one refractive index layer is between the two external absorbing layers of absorbing nanoparticles, wherein the at least one refractive index layer includes a carrier and at least one nanoparticle chosen from organic nanoparticles and inorganic nanoparticles, wherein the high refractive index layer comprises a high refractive index material with a first index of refraction, and the low refractive index layer comprises a low refractive index material having a second index of refraction, the first index of refraction being greater than 1.65 and the second index of refraction being less than 1.65, and wherein the article has one of the following layering structures:

(i) external absorbing/H or L with a specific quarter waves optical thickness (QWOT)/external absorbing;

(ii) external absorbing/stack/external absorbing;

(iii) external absorbing/H or L/absorbing/H or L/external absorbing; or (iv) external absorbing/stack/absorbing/stack/external absorbing, wherein absorbing refers to a layer of absorbing nanoparticles, and stack refers to a stack of alternating layers of low refractive index layers and high refractive index layers and wherein in the layering structures, adjacent layers separated by a backslash ("/") are in direct physical contact.

2. The article of claim 1, wherein the at least one refractive index layer has a specific number of quarter waves optical thickness.

3. The article of claim 1, wherein the layering structure is chosen from ii) and iv).

4. The article of claim 1, wherein the layering structure is chosen from iii) and iv).

5. The article of claim 4, wherein the layering structure is iii).

6. The article of claim 3, wherein the layering structure is iv).

7. The article of claim 1, wherein the layer of absorbing nanoparticles is not a layer of thin metal.

8. The article of claim 1, wherein the at least one refractive index layer is a carrier, wherein the carrier is an organic matrix.

9. The article of claim 1, wherein the two layers of absorbing nanoparticles each include optically active absorbing nanoparticles.

10. The article of claim 1, wherein the layer of absorbing nanoparticles includes at least one nanoparticle chosen from metal nanoparticles, metal oxide nanoparticles, metal sulfide nanoparticles, nanoparticles with absorbing properties, a nanoparticle of a high refractive index material, a nanoparticle of a low refractive index material, nanoparticles of colored materials, and combinations thereof.

11. The article of claim 10, wherein the nanoparticles of colored materials include organic pigments and dyes.

12. The article of claim 9, wherein the two layers of absorbing nanoparticles each comprise optically active absorbing nanoparticles and an energy cured material chosen from i) thermoplastics, ii) thermosets, or iii) other materials selected from acrylates, epoxies, vinyls, vinyl esters, styrenes, siloxanes, titanates, zirconates, aluminates, silicates, phosphazanes, polyborazylenes, polythiazyls, or combinations of the other materials.

* * * * *